(12) United States Patent
Hearidge

(10) Patent No.: US 6,551,004 B2
(45) Date of Patent: Apr. 22, 2003

(54) COMPENSATING LINKAGE

(76) Inventor: Ron Hearidge, 11361 Robert La., Garden Grove, CA (US) 92840

( * ) Notice: Subject to any disclaimer, the term of this patent is extended or adjusted under 35 U.S.C. 154(b) by 33 days.

(21) Appl. No.: 09/796,396

(22) Filed: Feb. 28, 2001

(65) Prior Publication Data

US 2002/0118996 A1 Aug. 29, 2002

(51) Int. Cl.$^7$ ................................................ B60K 41/22
(52) U.S. Cl. .......................... 403/76; 403/56; 403/52; 74/567; 74/569; 74/473.33
(58) Field of Search .............. 403/76, 77, 56, 403/52, 71, 151, 53, 61, 59, 60; 74/567, 569, 473.33; 285/224, 261; 292/DIG. 62

(56) References Cited

U.S. PATENT DOCUMENTS

| | | | |
|---|---|---|---|
| 4,344,334 A | * | 8/1982 | Schmittbetz et al. 74/473.33 X |
| 4,756,205 A | * | 7/1988 | Dickinson ............ 74/473.33 X |
| 4,883,287 A | * | 11/1989 | Murakami et al. .......... 280/665 |
| 4,912,997 A | * | 4/1990 | Malcolm et al. ..... 74/473.33 X |

* cited by examiner

Primary Examiner—Lynne H. Browne
Assistant Examiner—John R. Cottingham
(74) Attorney, Agent, or Firm—Nydegger & Associates

(57) ABSTRACT

A mechanical linkage for attaching a first load-carrying member to a second load-carrying member includes an elongated race that defines an axis and at least one ball. The elongated race is formed with an aperture that is surrounded by two opposed faces and two opposed semi-circular surfaces. Importantly, each face is formed with a channel that extends in a direction that is substantially parallel to the direction of the axis of the race. The ball is formed with a cylindrical thru-hole that passes through the center of the ball to allow the ball to be attached to the first load-carrying member while disposed within the aperture of the race. The race holds the ball but allows for limited rotation of the ball and translational movement of the ball along the axis of the race. The race includes an extension for attachment to the second load-carrying member.

19 Claims, 3 Drawing Sheets

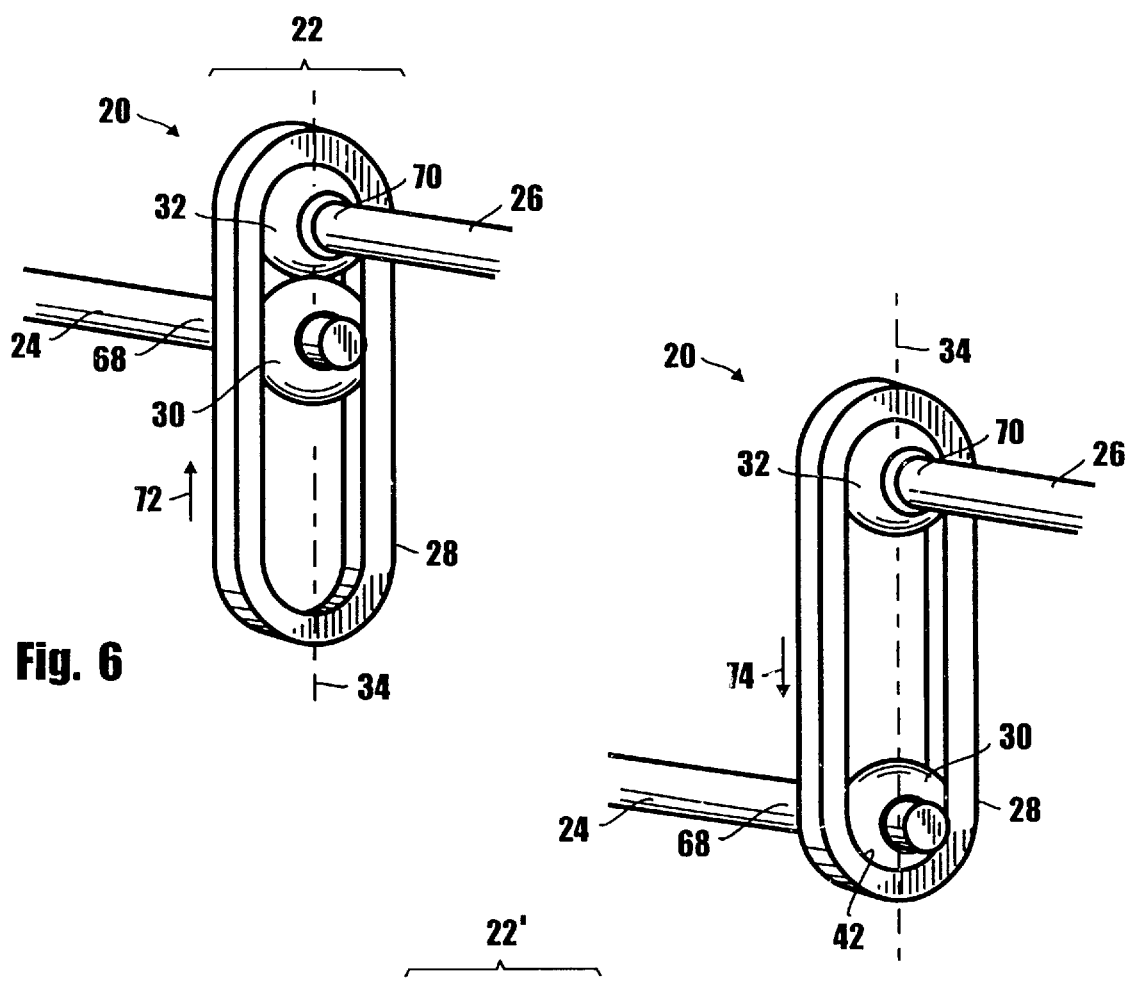
Fig. 6
Fig. 7
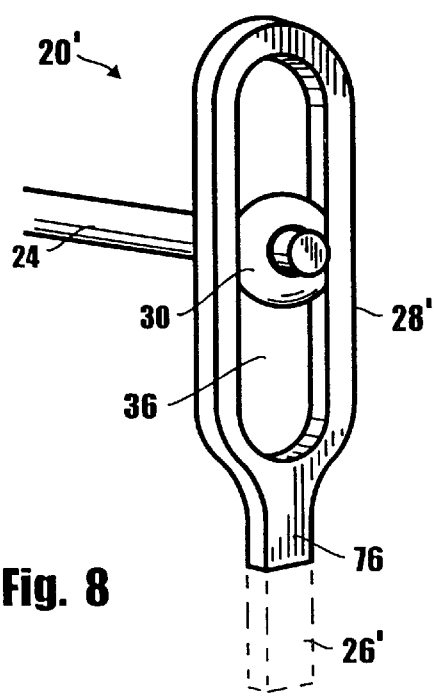
Fig. 8

US 6,551,004 B2

COMPENSATING LINKAGE

FIELD OF THE INVENTION

The present invention pertains generally to mechanical linkages. More particularly, the present invention pertains to mechanical linkages that allow for limited translational and rotational movement between the links. The present invention is particularly, but not exclusively, useful as a mechanical linkage for use in conjunction with an anti-sway bar on an oval track race car.

BACKGROUND OF THE INVENTION

Anti-sway bars can be used to reduce the amount of body roll experienced by an automobile during turning while having a minimal effect on the suspension characteristics of an automobile during straight travel. A typical anti-sway bar consists of a torsion bar section and two anti-sway bar arms that extend laterally from each end of the torsion bar section. For all uses, the torsion bar section is attached to the automobile frame. When used on the front of an automobile, one of the anti-sway bar arms is attached to a control arm for one wheel, while the second anti-sway bar arm is attached to a control arm for the wheel on the other side of the automobile. Typically, rod ends having spherical bearings are used to connect the anti-sway bar arms to the control arms. During a turn, the frame and/or body of the automobile moves relative to the wheels and control arms (i.e. body roll) due to the centrifugal forces generated during the turn. During this roll, each sway bar arm rotates about the torsion bar section, causing the torsion bar section to twist. It is the resistance of the torsion bar section to this twisting force that reduces the amount of body roll experienced by an automobile during the turn.

One problem with anti-sway bars is their effect during a turn when one of the wheels encounters a bump or pothole. For example, consider an anti-sway bar equipped automobile that is turning to the left. As described above, during the turn, the anti-sway bar will be loaded, reducing the amount of body roll experienced by the automobile. It is known that when the left wheel encounters a bump or pothole, the loaded anti-sway bar will transmit a force to the right wheel due to the bump or pothole. Specifically, during a moderate to severe turn, the force transmitted to the right wheel is often sufficient to cause the right tire to lose traction and may even cause the right tire to leave the pavement. This loss of traction can affect the steering response of the automobile, and thus should be avoided.

Oval track race cars generally travel around the track in a counter-clockwise direction, and consequently, designers of oval track race cars are primarily concerned with reducing body roll during a left turn. Thus, a typical anti-sway bar reduces body roll equally in left turns and right turns, and is subject to traction loss during a turn that is often inappropriate for an oval track race car.

In light of the above, it is an object of the present invention to provide anti-sway bar systems capable of reducing body roll during a left turn while eliminating the transmission of forces through the anti-sway bar that reduce traction when the left wheel encounters a bump or pothole. It is another object of the present invention to provide a linkage between two members that allows for relative movement of the members in a chosen direction before forces carried by the members are transmitted across the linkage. Yet another object of the present invention is to provide a compensating linkage which is easy to use, relatively simple to manufacture, and comparatively cost effective.

SUMMARY OF THE PREFERRED EMBODIMENTS

The present invention is directed to a mechanical link for attaching a first load-carrying member such as a sway bar arm to a second load-carrying member such as a control arm for the front wheel of an oval track race car. For the present invention, the mechanical link includes at least one ball and an elongated race that defines an axis. The ball is provided for attachment to the first load-carrying member and engagement with the race, while the race is provided for attachment to the second load-carrying member.

The elongated race is formed with an aperture that is surrounded by two opposed faces and two opposed semi-circular surfaces. As such, the opposed faces are connected to each other by the opposed semi-circular surfaces. Importantly, each face is formed with a channel that extends in a direction that is substantially parallel to the direction of the axis of the race. Preferably, each channel has a circular cross-sectional shape normal to the direction of the channel. Additionally, each semi-circular surface is formed with a channel extending along each semi-circular surface to connect the channel on one face to the channel on the other face. As such, the aperture of the race is surrounded by one continuous channel that extends along each face and along each semi-circular surface. Preferably, the continuous channel has a substantially constant radius of curvature, $r_{channel}$, normal to the direction of the channel. For the present invention, the closest distance between the opposed faces is designated, $d_{aperture, min}$, and the farthest distance between the opposed faces is designated, $d_{aperture, max}$.

The link further includes at least one ball having a substantially spherical outer surface of radius, $r_{ball}$. For the present invention, the ball is sized to have a radius, $r_{ball}$, that is equal or slightly smaller than the radius of curvature of the channel, $r_{channel}$. Preferably, the ball is formed with a cylindrical thru-hole that passes through the center of the ball. As such, two circular openings are provided for the thru-hole that are separated by a distance, $d_{ball, min}$. For the present invention, the ball and thru-hole are sized such that $d_{ball, min}$ is less than $d_{aperture, min}$. Further, the ball and thru-hole are sized such that the diameter of the ball (i.e. $2 \times r_{ball}$) is greater than $d_{aperture, min}$ but less than $d_{aperture, max}$.

With this cooperation of structure, the ball can be engaged with the race to provide a mechanical link when the first load-carrying member is attached to the ball and the second load-carrying member is attached to the race. Specifically, with this cooperation of structure, the ball can be disposed within the aperture of the race by first positioning the ball adjacent to the race with the circular openings of the thru-hole aligned with the opposed faces of the race aperture. With this alignment, the ball can be inserted into the aperture, since $d_{ball, min}$ is less than $d_{aperture, min}$. Next, the ball can be rotated until the circular openings of the thru-hole are aligned roughly perpendicular to the opposed faces of the race aperture since the quantity $(2 \times r_{ball})$ is less than $d_{aperture, max}$, and $r_{ball}$ is equal or slightly smaller than the radius of curvature of the channel, $r_{channel}$. In this alignment, the ball is confined within the aperture of the race since the quantity $(2 \times r_{ball})$ is greater than $d_{aperture, min}$.

Once the ball is confined within the aperture of the race, the first load-carrying member can be attached to the ball. Preferably, the first load-carrying member is formed with a cylindrical protrusion that can be engaged with the thru-hole of the ball. Specifically, it is contemplated for the present invention that the cylindrical protrusion on the first load-carrying member can be inserted into one of the circular openings of the thru-hole until the cylindrical protrusion projects from the other circular opening of the thru-hole. Once inserted in this manner, the cylindrical protrusion can be secured to the ball by pressing a quick-release pin through a passageway formed in the portion of the cylindrical protrusion that projects from the thru-hole.

It is to be appreciated that once the first load-carrying member is attached to the ball as described above, the ball will be unable to rotate into a position where the circular openings of the thru-hole are aligned with the opposed faces of the race aperture. Consequently, once the first load-carrying member is attached to the ball, the ball will be confined within the aperture of the race. It is to be further appreciated that although the ball is confined within the aperture of the race the ball is free to translate within the aperture and along the axis of the race. Additionally, with this combination of structure, the ball will enjoy a limited amount of rotation about the center of the ball. It is to be appreciated that the exact amount of rotation enjoyed by the ball will depend on the dimensions of the ball, the race and the first member, and that the rotation of the ball will be limited by contact between the first member and the race.

In one embodiment of the present invention, the race is formed with an extension in addition to the portion of the race that surrounds the elongated aperture. Preferably, the extension projects axially from the race portion that surrounds the aperture and is formed with a recess. For the present invention, a portion of the second member can be inserted into the recess to allow for direct attachment of the race to the second member. This location for the extension on the race allows for attachment of the second member to the race without limiting the movement of the ball and first member in the aperture of the race.

In another embodiment for the present invention, two identical balls are disposed within the aperture of the race, with each ball having the features described above. The first ball is attached to the first load-carrying member and the second ball is attached to the second load-carrying member. Each ball is attached to the corresponding load-carrying member as described above. As such, each ball is free to translate within the aperture and along the axis of the race, and each ball will enjoy a limited amount of rotation. It is to be appreciated that the amount of translation each ball will have will be limited by the presence of the other ball.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 6 is a perspective view of a linkage in accordance with the present invention as shown FIG. 1 after the first load-carrying member has been translated toward the second load-carrying member;

FIG. 7 is a perspective view of a linkage in accordance with the present invention as shown FIG. 1 after the first load-carrying member has been translated away from the second load-carrying member;

FIG. 8 is a perspective view of another embodiment of a linkage in accordance with the present invention, shown creating a mechanical link between a first load-carrying member and a second load-carrying member;

DESCRIPTION OF THE PREFERRED EMBODIMENT

Figure 1:
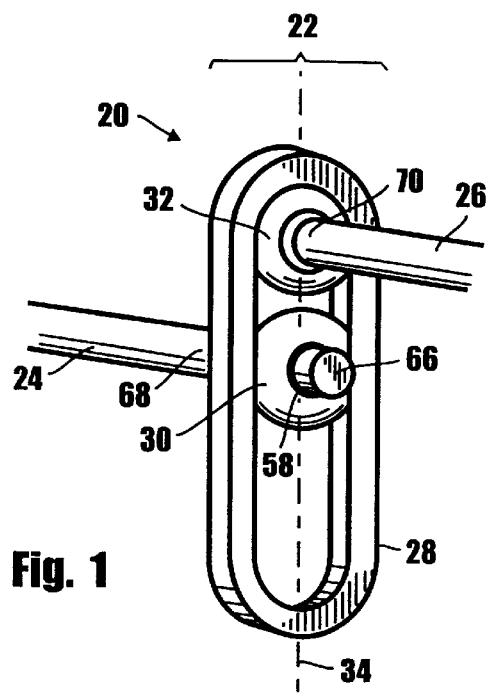
FIG. 1 is a perspective view of a linkage in accordance with the present invention, shown creating a mechanical link between a first load-carrying member and a second load-carrying member.

Referring initially to FIG. 1, a system in accordance with the present invention is shown and generally designated 20. As shown in FIG. 1, the system 20 includes a linkage 22 for attaching a load-carrying member 24 to another load-carrying member 26. For the present invention, the member 24 may be an arm for a sway bar (not shown) and the member 26 may be a control arm for the front wheel of an oval track race car (also not shown). Further, in FIG. 1, it can be seen that the linkage 22 includes an elongated race 28 and two balls 30, 32. In overview, FIG. 1 shows that ball 30 is attached to member 24, ball 32 is attached to member 26 and that the balls 30, 32 are engaged with the race 28.

Figure 2:
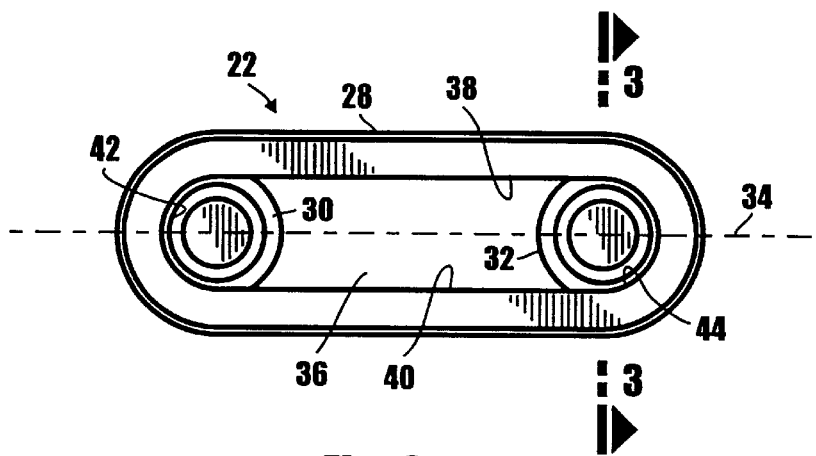
FIG. 2 is a plan view of the linkage shown in FIG. 1 showing the elongated race with two balls disposed in the aperture of the race.
Figure 3:
FIG. 3 is a cross-section of the race and ball of the linkage as seen along line 3—3 in FIG. 2.

Referring now to FIG. 2, it can be seen that the race 28 is elongated and defines an axis 34. Further, the elongated race 28 is formed with an aperture 36 that is surrounded by two opposed faces 38, 40 and two opposed semi-circular surfaces 42, 44. As shown, face 38 is connected to semicircular surface 42 which in turn is connected to face 40. Similarly, face 40 is connected to semi-circular surface 44 which in turn is connected to face 38. With cross reference to FIGS. 2 and 3, it can be seen that the balls 30, 32 can be disposed within the aperture 36.

Figure 4:
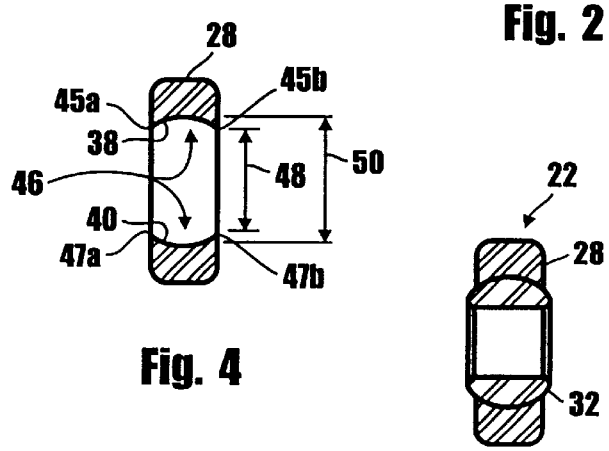
FIG. 4 is a cross-section of the race shown in FIG. 3.

With cross reference to FIGS. 2 and 4, it is to be appreciated that face 38 extends from edge 45a to edge 45b and face 40 extends from edge 47a to edge 47b, and each face 38, 40 is formed with a channel 46 that extends in a direction (channel direction) that is substantially parallel to the direction of the axis 34. Preferably, as shown, channel 46 has a circular cross-sectional shape normal to the channel direction of the channel 46. Additionally, each semi-circular surface 42, 44 is formed with a channel 46 extending along each semi-circular surface 42, 44 to connect the channel 46 on face 38 to the channel 46 on face 40. As such, the aperture 36 of the race 28 is surrounded by one continuous channel 46 that extends along each face 38, 40 and along each semi-circular surface 42, 44. Preferably, the continuous channel 46 has a substantially constant radius of curvature, $r_{channel}$, normal to the channel direction. As such, the channel 46 defines a distance 48 representing the closest distance between the opposed faces 38, 40, also designated $d_{aperture, min}$, and a distance 50 representing the farthest distance between the opposed faces 38, 40, also designated $d_{aperture, max}$.

Figure 5:
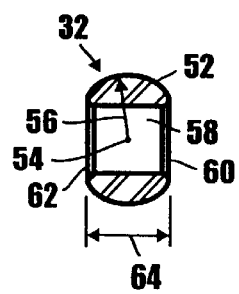
FIG. 5 is a cross-section of the ball shown in FIG. 3.

With cross reference to FIGS. 2 and 5, the link 22 preferably includes two balls 30, 32 that are substantially identical in size and shape. FIG. 5 shows that the ball 32 is formed with a substantially spherical outer surface 52 that defines a center 54 for the ball 32. Further, the substantially spherical outer surface 52 has a radius 56, also designated, $r_{ball}$. With continued reference to FIG. 5, the ball 32 is preferably formed with a cylindrical thru-hole 58 that passes through the center 54 of the ball 32. As such, two circular openings 60, 62 are provided for the thru-hole 58 that are separated by a distance 64, also designated, $d_{ball, min}$. The cooperation of structure between the ball 32 and the race 28 can best be seen with reference to FIGS. 2–5. As shown, the ball 32 is sized with a radius 56 or $r_{ball}$, that is equal or slightly smaller than the radius of curvature of the channel 46 ($r_{channel}$). Further, the ball 32 and thru-hole 58 of the ball 32 are sized such that the distance 64 ($d_{ball, min}$) is less than the distance 48 ($d_{aperture, min}$). Further the ball 32 and thru-hole 58 of the ball 32 are sized such that the diameter of the ball (i.e. $2 \times r_{ball}$) is greater than the distance 48 ($d_{aperture, min}$) but less than the distance 50 ($d_{aperture, max}$).

With this cooperation of structure, the ball 32 can be disposed within the aperture 36 of the race 28 by first positioning the ball 32 adjacent to the race 28 with the circular openings 60, 62 of the thru-hole 58 aligned with the opposed faces 38, 40 of the aperture 36. With this alignment, the ball 32 can be inserted into the aperture 36, since the distance 64 ($d_{ball, min}$) is less than the distance 48 ($d_{aperture, min}$). Next, the ball 32 can be rotated about the axis 34 until the openings 60, 62 of the thru-hole 58 are aligned roughly perpendicular to the opposed faces 38, 40 of the race 28 since the quantity ($2 \times r_{ball}$) is less than the distance 50 ($d_{aperture, max}$), and the radius 56 ($r_{ball}$) is equal or slightly smaller than the radius of curvature of the channel 46 ($r_{channel}$). In this alignment, the ball 32 is confined within the aperture 36 of the race 28 since the quantity ($2 \times r_{ball}$) is greater than distance 48 ($d_{aperture, min}$).

Once the balls 30, 32 are disposed and oriented for confinement within the aperture 36, the load-carrying members 24, 26 can be attached to the balls 30, 32, respectively, as shown in FIG. 1. Preferably, as shown, each load-carrying member 24, 26 is formed with a cylindrical protrusion 66 that can be engaged with the thru-hole 58 of the ball 30. Once the protrusion 66 is inserted into the thru-hole 58, the protrusion 66 can be secured to the ball 30 by any technique known in the pertinent art such as the use of a nut, cotter pin, or quick-release pin (not shown).

With cross-reference to FIGS. 1, 2 and 5, it is to be appreciated that once the load-carrying members 24, 26 are attached to the balls 30, 32 as described above, the balls 30, 32 will be unable to rotate into a position where the circular openings 60, 62 are aligned with the opposed faces 38, 40 of the aperture 36. Consequently, once the load-carrying members 24, 26 are attached to the balls 30, 32, the balls 30, 32 will be confined within the aperture 36 of the race 28. It is to be further appreciated that although the balls 30, 32 are confined within the aperture 36 of the race 28, the balls 30, 32 are free to translate within the aperture 36 and along the axis 34 of the race 28. Additionally, with this combination of structure, each ball 30, 32 will enjoy a limited amount of rotation about their center 54. It is to be appreciated that the exact amount of rotation enjoyed by each ball 30, 32 will depend on the dimensions of the ball 30, 32, the race 28 and the load-carrying members 24, 26.

Referring now to FIGS. 1, 6 and 7, three different force conditions for the linkage 22 are shown. In FIG. 1, the linkage 22 is shown in a condition in which a force is not being transmitted across the linkage 22. As shown, both members 24, 26 are held stationary with respect to the linkage 22 and the race 28 is floating. Stated another way, the end 68 of member 24 is free to rotate and translate along axis 34 at least a finite amount without affecting or being affected by the end 70 of member 26. For example, FIG. 1 can represent the setup position for an anti-sway bar system with member 24 being an anti-sway bar arm and member 26 being attached to a control arm. As such, FIG. 1 represents the condition for the linkage 22 while the automobile is travelling straight.

FIG. 6 shows the condition of the linkage 22 after a force has been applied to translate the end 68 of member 24 in the direction of arrow 72 and a force has been applied to hold the end 70 of member 26 stationary. When such forces are applied, the ball 30 translates along the axis 34 in the direction of arrow 72 until the ball 30 contacts the ball 32, at which point the force applied to member 24 is transmitted across the linkage 22 to the member 26. Comparing FIG. 6 to FIG. 1, it can be seen that the end 70 of member 24 travels only a short distance before ball 30 contacts ball 32, thus for forces applied in the direction of arrow 72, little movement between members 24, 26 is allowed before the force is transmitted across the linkage 22.

FIG. 7 shows the condition of the linkage 22 after a force has been applied to translate the end 68 of member 24 in the direction of arrow 74 and a force has been applied to hold the end 70 of member 26 stationary. When such forces are applied, the ball 30 translates along the axis 34 in the direction of arrow 74 until the ball 30 contacts the semi-circular surface 42 of the race 28, at which point the force applied to member 24 is transmitted across the linkage 22 to the member 26. Comparing FIG. 7 to FIG. 1, it can be seen that the end 70 of member 24 travels a significant distance before ball 30 contacts the semi-circular surface 42 of the race 28, thus for forces applied in the direction of arrow 74, significant movement between members 24, 26 is allowed before the force is transmitted across the linkage 22. It is to be appreciated that the amount of relative movement between the members 24, 26 in each direction can be varied by the proper dimensioning and setup of the linkage 22.

Figure 9:
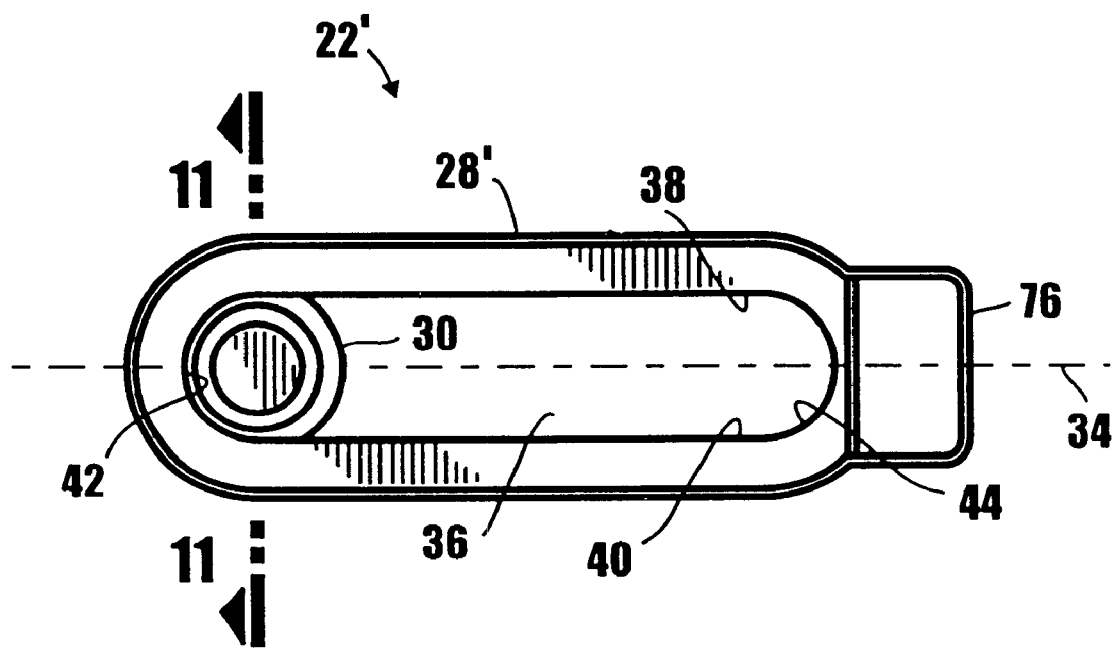
FIG. 9 is a plan view of the linkage shown in FIG. 8 showing the elongated race with an extension for attachment to the second load-carrying member and a ball disposed in the aperture of the race for attachment to the first load-carrying member.
Figure 10:
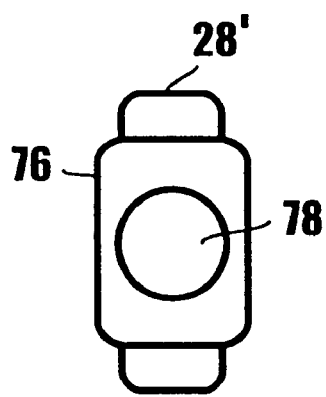
FIG. 10 is a bottom plan view of the linkage shown in FIG. 8 showing the extension and recess for attachment of the race to the second load-carrying member.

FIGS. 8–10 show another embodiment of the present invention. Referring to FIG. 8, in this embodiment, a system 20' includes a linkage 22' for attaching a load-carrying member 24 to another load-carrying member 26'. As further shown in FIG. 8, the linkage 22' includes an elongated race 28' and one ball 30. For this embodiment, the ball 30 and aperture 36 are preferably sized with the relative dimensions described above. In overview, FIG. 8 shows that ball 30 is attached to member 24, the race 28' is attached to member 26, and the ball 30 is engaged with the race 28'.

Figure 11:
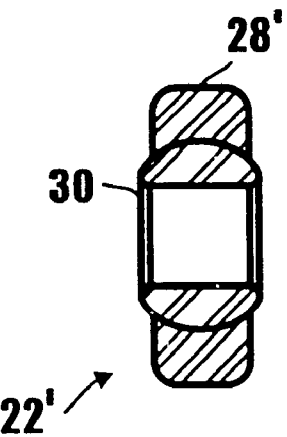
FIG. 11 is a cross-section of the linkage as seen along line 11—11 in FIG. 9.

Referring now to FIGS. 9 and 10, it can be seen that the race 28' for this embodiment is elongated and defines an axis 34. Further, the elongated race 28' is formed with an extension 76 having a recess 78 for attachment of the race 28' to the member 26'. With cross reference to FIGS. 9 and 11, it can be seen that the race 28' is also formed with an aperture 36 that is surrounded by two opposed faces 38, 40 and two opposed semi-circular surfaces 42, 44. Further, it can be seen that the ball 30 can be disposed within the aperture 36 for confined movement along axis 34.

While the particular linkage system as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A mechanical linkage for connecting a first load-carrying member to a second load-carrying member, said linkage comprising:

a ball formed with a hole for attachment to the first member; and an elongated race for attachment to the second member, said race formed with an aperture surrounded by a first face, a second face opposed to said first face and two opposed end surfaces, said first face being formed as a first channel and said second face being formed as a second channel oriented substantially parallel to said first channel, said channels for holding said ball within said aperture when said ball is attached to the first member.

2. A linkage as recited in claim 1 wherein said race is formed with an extension having a recess for attachment of said race to the second member.

3. A linkage as recited in claim 1 wherein said ball is a first ball and further comprising a second ball for confined movement within said aperture, said second ball formed with a hole for mounting said second ball on the second member to attach said race to said second member.

4. A linkage as recited in claim 1 wherein said first channel is oriented in a first direction and has a circular cross-section in a plane normal to said first direction, and said second channel has a circular cross-section in said plane.

5. A linkage as recited in claim 4 wherein said ball has a spherical surface that defines a center for said ball and wherein said hole is a cylindrical thru-hole extending through said center of said ball.

6. A linkage as recited in claim 5 wherein said cylindrical thru-hole has two openings and the distance between said openings is less than the minimum distance between said first face and said second face.

7. A linkage as recited in claim 6 wherein the distance between said center and said spherical surface of said ball is greater than the minimum distance between said first face and said second face.

8. A linkage as recited in claim 7 wherein the distance between said center of said ball and said spherical surface of said ball is less than the maximum distance between said first face and said second face.

9. A linkage as recited in claim 6 wherein the radius of curvature of said spherical surface of said ball is less than the radius of curvature of said circular cross-section of said first channel.

10. A linkage as recited in claim 1 wherein each said end surface is formed as a semi-circle to connect said first face to said second face.

11. A linkage as recited in claim 10 wherein each said end surface is formed as a channel to establish a continuous channel surrounding said aperture.

12. A mechanical linkage for connecting a first load-carrying member to a second load-carrying member, said linkage comprising:

a first ball for attachment to the first member;

a second ball for attachment to the second member; and an elongated race that defines an axis and is formed with an aperture surrounded by two opposed faces and two opposed end surfaces, each said face being formed as a channel with said channels being oriented substantially parallel to said axis to hold said balls in said aperture when said first ball is attached to the first member and said second ball is attached to the second member.

13. A linkage as recited in claim 12 wherein said first ball is formed with a hole for attachment to the first member and said second ball is formed with a hole for attachment to the second member.

14. A linkage as recited in claim 12 wherein each said channel has a circular cross-section in a plane normal to said axis.

15. A linkage as recited in claim 12 wherein said first ball has a spherical surface that defines a center for said first ball and is formed with a cylindrical thru-hole extended through said center of said first ball, and said second ball has a spherical surface that defines a center for said second ball and is formed with a cylindrical thru-hole extended through said center of said second ball.

16. A system for force transmission comprising:

a first load-carrying member;

a second load-carrying member;

a ball attached to said first member; and an elongated race attached to said second member, said race formed with an aperture surrounded by a first face, a second face opposed to said first face and two opposed end surfaces, said first face having a first edge and a second edge and being formed as a first channel therebetween, said second face being formed as a second channel oriented substantially parallel to said first channel, said second face having an edge, with said edge being spaced from said first and second edges of said first face, said channels for holding said ball within said aperture.

17. A system as recited in claim 16 wherein said first member comprises an anti-swaybar arm and said second member comprises a control arm.

18. A system as recited in claim 16 wherein said race is formed with an extension having a recess to attach said race to said second member.

19. A system as recited in claim 16 wherein said ball is a first ball and further comprising a second ball for confined movement within said aperture, said second ball mounted on said second member to attach said race to said second member.

* * * * *